United States Patent [19]

Shockley

[11] Patent Number: 5,555,664
[45] Date of Patent: Sep. 17, 1996

[54] DEVICE FOR ATTRACTING ANIMALS

[76] Inventor: Robert S. Shockley, P.O. Box 2228, Conway, Ark. 72033

[21] Appl. No.: 378,538

[22] Filed: Jan. 26, 1995

[51] Int. Cl.⁶ .................................................. A01M 31/06
[52] U.S. Cl. ................................................ 43/1; 446/397
[58] Field of Search ........................... 43/1, 2; 446/397, 446/418, 419

[56]    References Cited

U.S. PATENT DOCUMENTS

| | | | |
|---|---|---|---|
| 3,689,927 | 9/1972 | Boston | 343/225 |
| 4,610,641 | 9/1986 | Allen | 446/397 |
| 4,845,873 | 7/1989 | Hazlett | 43/3 |
| 4,850,925 | 7/1989 | Ady | 446/207 |
| 4,850,928 | 7/1989 | Stewart | 446/397 |
| 4,953,763 | 9/1990 | Kierum et al. | 222/644 |
| 5,029,408 | 7/1991 | Smith | 43/1 |
| 5,158,494 | 10/1992 | Ball | 446/419 |
| 5,233,780 | 8/1993 | Overholt | 43/2 |
| 5,254,028 | 10/1993 | Liao | 446/397 X |
| 5,402,102 | 3/1995 | Lachance | 446/397 X |

*Primary Examiner*—Mickey Yu

[57]    ABSTRACT

A device for attracting animals, particularly those animals bearing antlers, incorporating antler rattling, scent sprays and calls. The device is operable at a distance by the user. In the preferred embodiment, radio controlled servo mechanisms operate the various sense stimulators. Alternatively, automatic timing mechanisms may be employed.

8 Claims, 6 Drawing Sheets

DEVICE FOR ATTRACTING ANIMALS

FIELD OF THE INVENTION

The present invention relates generally to devices for attracting animals, particularly those animals bearing antlers and more specifically to devices that incorporate antler rattling or scent sprays that may be set to operate while the hunter is at a distance from the device.

BACKGROUND OF THE INVENTION

Antler-bearing animals, such as deer and elk and the like, have been prize trophies for many hunters for centuries. Many hunters try to bag a trophy animal but only a small amount are successful. The antler-bearing animals have three advantages; they have keen sight, smell, and hearing. A human alerting any one of these senses will alert the animal which will slip away from the hunter and keep a distance between the hunter without ever being seen.

To overcome this problem, hunters have adopted various devices for attracting the animal while allowing the hunter to remain at a distance. These devices play on the keen senses of the animal to attract the animal to the device through powerful signals to which the animals will respond. For example, one scent spray method commonly used involves spraying scent on the hunter's pants legs and the bottom heel part of his shoes. The scent is typically obtained from the urine of the animal, perhaps from a sexually active female, which therefore contains powerful pheromones attractive to the male animal. An example of a scent dispensing apparatus is found in U.S. Pat. No. 4,953,763 issued to Kierum et al. on Sep. 4, 1990 for "Animal Scent Dispensing Apparatus". Kierum discloses a scent-containing reservoir dispensing scent in a dripping fashion.

Another method of attracting antler-bearing animals reproduces or simulates the sound of two deer sparring. In sparring, antler-bearing animals fight with their antlers and foreheads to determine which buck earns the right to the herd and access to reproduction. The sound of antlers rattling can be performed manually by holding an antler in one hand and clashing or lightly striking it into another antler held in the other hand. While actual antlers may be used, numerous varieties of synthetic antlers have been suggested. For example, U.S. Pat. Nos. 4,850,928 and 4,610,641 disclose synthetic antlers. Devices other than synthetic antlers have been disclosed which simulate the sound of antlers rattling. Such devices are found in U.S. Pat. Nos. 5,334,074 and 5,158,494. Another commonly used means of simulating the sound of antlers rattling is to place a number of wooden rods in a cloth bag and to strike the bag against an object to cause the clacking sound of antlers rattling.

Animals may also be attracted by calls. An example of a mechanical (as opposed to reproduction of a call by sound recording and playback means) deer call, is disclosed in U.S. Pat. No. 4,850,925.

In order to increase the effectiveness of the device, more than one of the senses of the animal may be stimulated. U.S. Pat. No. 5,029,408 issued to Smith on Jul. 9, 1991 for "Deer Attracting Device" discloses a device which includes a noise generator, a movement generator, and a scent generator, all of which operate under the control of timers activated by a remote switch. The movement generator simulates the movement of a deer tail, the scent generator uses a heated element to evaporate scent, and the noise generator is an electrical solenoid moving a scraping element over a sounding board element.

While Smith discloses the use of a remotely operated switch, true remote control of the radio type has been used to improve the realism of decoys. U.S. Pat. No. 3,689,927 issued to Boston on Sep. 5, 1972 for "Radio-Controlled Decoy" discloses a water fowl decoy having a servo operated rudder to steer the decoy from a remote radio transmitter. U.S. Pat. No. 5,233,780 issued to Overholt on Aug. 10, 1993 for "Remotely Controlled Decoy and Method" discloses a radio controlled decoy employing a number of auditory and visual signals for attracting game. The decoy of Overholt takes the form of fowl, such as turkeys, geese, ducks, and the like. Overholt specifically discloses means for generating movement of the decoy and for operating a mechanical type game call where sound is produced from the friction of one member moving against another.

There are various disadvantages to the use of manual antler rattling methods. For example, the animal may sight the movement of the hunter before it is drawn closely enough by the sound of the antlers. Furthermore, the sound of the antlers may attract the attention of another hunter, there by placing the hunter making the rattling sounds at risk of the other hunter shooting toward the sound.

Accordingly, besides the objects and advantages of antler rattling and scent use as set forth above, other objects of the present invention are:

(a) to provide an antler rattling and scent release device that is lightweight and therefore easily carried and deployed;

(b) to provide the flexibility of a tripod type stand with adjustable length legs, allowing for deployment on uneven ground;

(c) to provide alternative deployment means so that the present invention may be strapped to an object off the ground;

(d) to provide an antler rattling and scent release device that will operate remotely from human hands and human scent by the use of radio remote control or by a repeat cycle time delay mechanism;

(e) alternatively, to provide for a device that combines antler rattling, scent release and a game call.

SUMMARY OF THE INVENTION

As noted above, the invention may be provided with a tripod stand. A camouflage skirt may be draped around the legs. A box is mounted on the stand or deployed from a tree or other upright object. The box contains the mechanical components capable of operating the antler rattler and scent spray. An antler or antler simulating object hangs from an arm allowing it to be able to swing in order to strike against another antler or object to produce the clacking sound of antlers rattling. The arm swinging the antler is moved by a servo mechanism, or in the alternative of a timer operation of the device, a motor. A second servo mechanism or motor is used to operate a linkage to a scent spray arm causing scent to be released into the air. A scent-containing bottle is operatively joined to a pressurized aerosol spray canister. The scent bottle can easily be filled and refilled by simply unscrewing the bottle from the canister, filling the bottle with a liquid scent and then screwing the scent bottle back onto the canister. A third servo mechanism or motor may be used to operate an animal call, such as a deer call.

The capability of being able to rattle antlers, spray scent, and operate a deer call mechanically without human direct contact can be accomplished either by radio remote control system, consisting of a transmitter, receiver, and three motors or servo mechanisms. Alternatively, a repeat cycle time delay mechanism and three motors or servo mechanisms may be used to perform the three functions of the present invention. In either case a battery supplies power to all electrically operated parts and the battery is operated by an on/off switch mounted on the front side of the box.

This method of rattling antlers, spraying scent and operating a deer call mechanically is not limited to deer. Other antler-bearing animals such as elk, caribou, sheep, goats, and the like can be attracted by switching antlers, scent and the call to attract a different species of animal. Other objects and advantages of the present invention will appear from the detailed description of the preferred embodiments in conjunction with the appended drawings as described below.

DETAILED DESCRIPTION OF THE PREFERRED EMBODIMENTS

Figure 1:
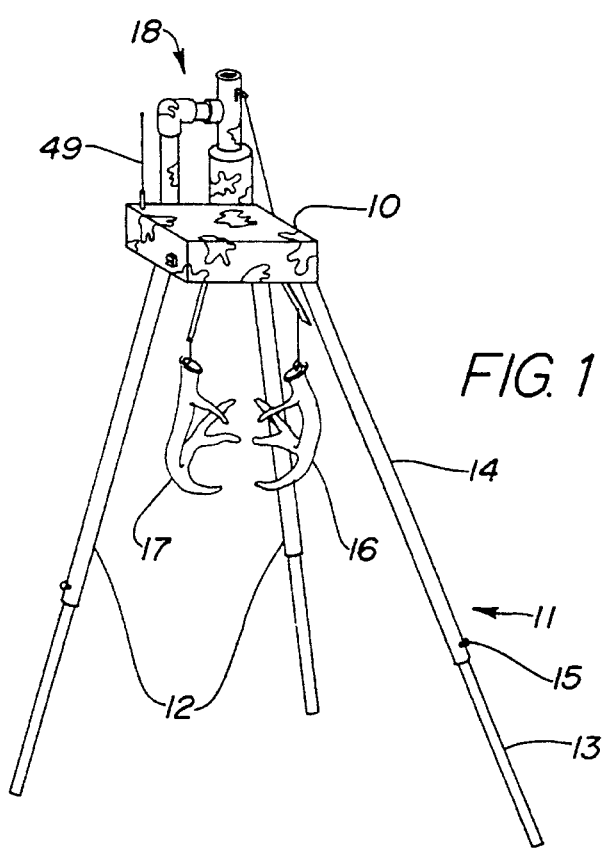
FIG. 1 is a perspective view of the invention as mounted on a tripod.

The preferred embodiment of the present invention may be described with reference to FIG. 1. A component box 10 is supported above the surface of the ground by a support tripod 11. Each leg 12 of the tripod 11 is adjustable for placement of the device on uneven ground. The adjustability of each leg 12 is by means of a lower leg segment 13 which is slidably received into an upper leg segment 14 in a telescoping fashion. The position of the lower leg segment 13 relative to the upper leg segment 14 and thereby the length of the leg 12 is fixed by a set screw 15.

A hanging antler 16 and a swingable antler 17 are hung beneath the component box 10. The height of the component box 10 above the surface of the ground is not critical so long as the antlers 16,17 are able to move without interference. In the preferred embodiment the present invention is also provided with a scent spray assembly 18, which will be described in detail below.

Figure 2:
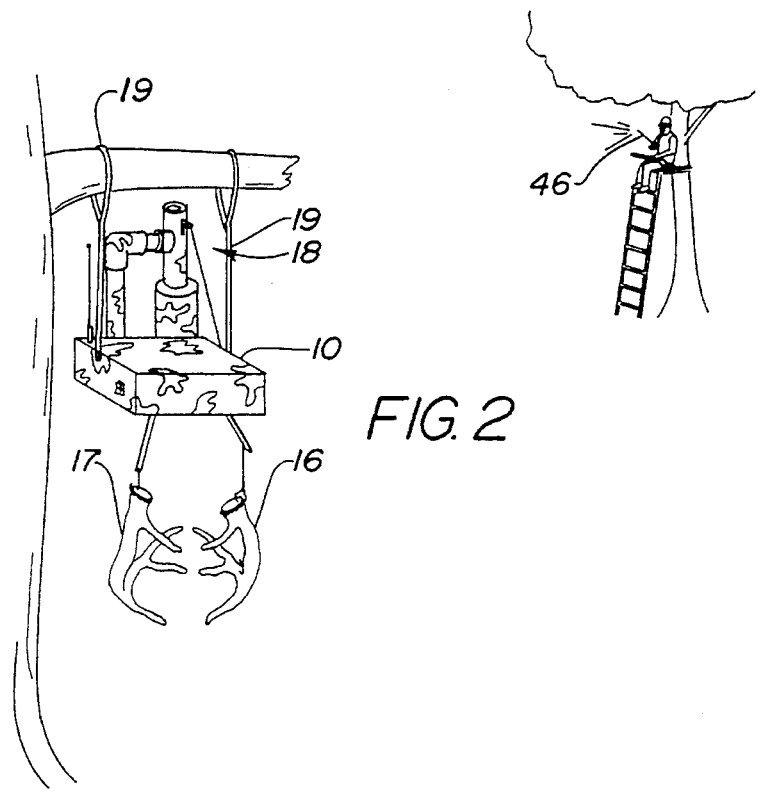
FIG. 2 is a perspective view of the invention as deployed from a tree limb and depicting a user operating a remote control radio transmitter.

As an alternative to the use of a tripod 11, the invention may be supported by a tree or other free standing object. An alternative means of support is shown in FIG. 2 where the invention is suspended from a tree limb by means of straps 19. The invention may also be tightly strapped to a tree limb. In these embodiments, the tripod 11 is not required. Other means of supporting or mounting the invention are considered to be within the scope of the invention; e.g., the invention could be strapped to a tree trunk rather than hung from a limb. Another embodiment of support means could be the mounting of the component box 10 within a decoy body simulating the appearance of a deer or the like. In this embodiment, the antlers 16,17 would be deployed below the decoy body.

Whatever means of mounting or supporting the invention is used, the user may be located at a distance from the invention so as not to alarm the animal being attracted by sound, movement or scent as shown in FIG. 2.

Figure 3:
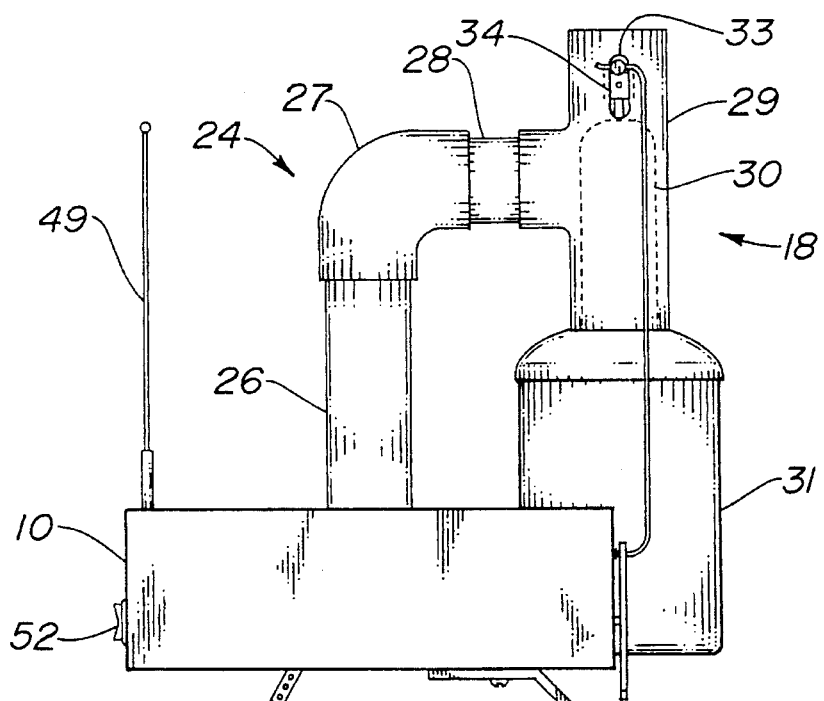
FIG. 3 is a front elevation showing the invention with support means removed for clarity.
Figure 3:
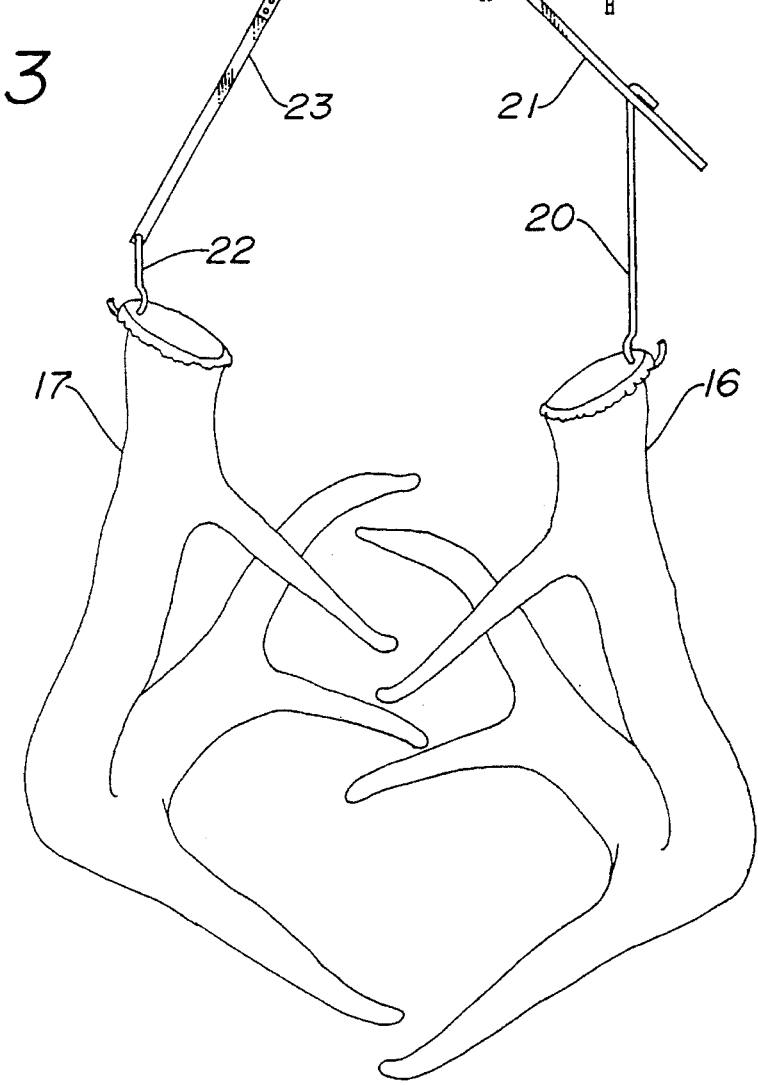
Figure 4:
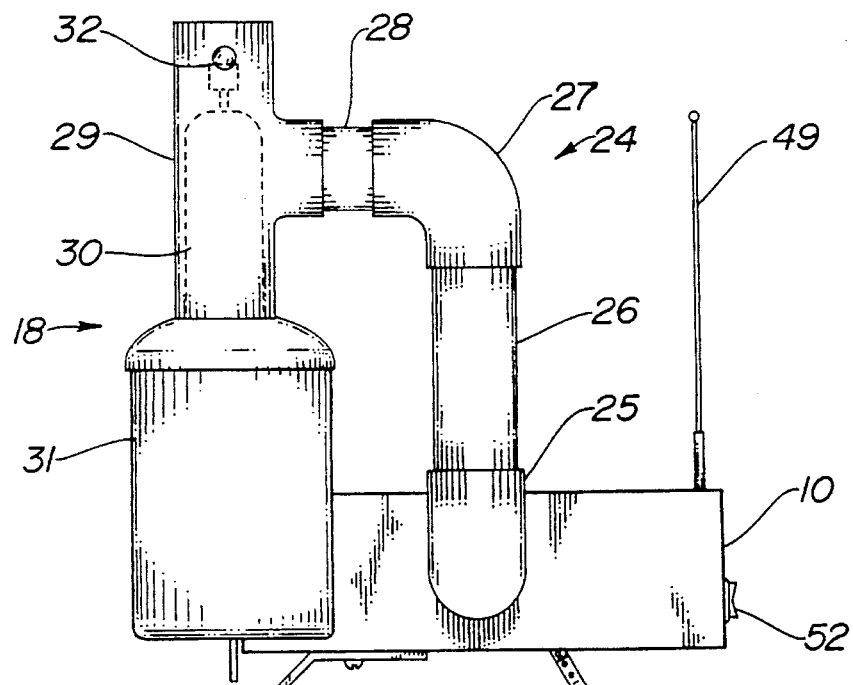
FIG. 4 is a rear elevation showing the invention with support means removed for clarity.
Figure 4:
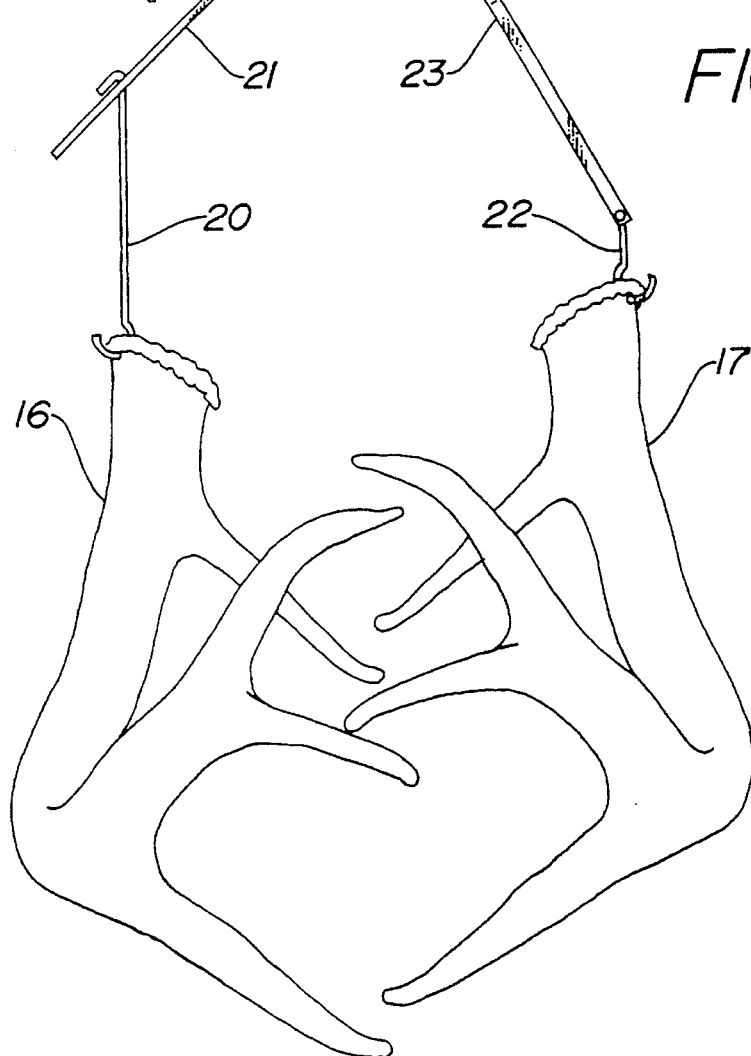
Figure 5:
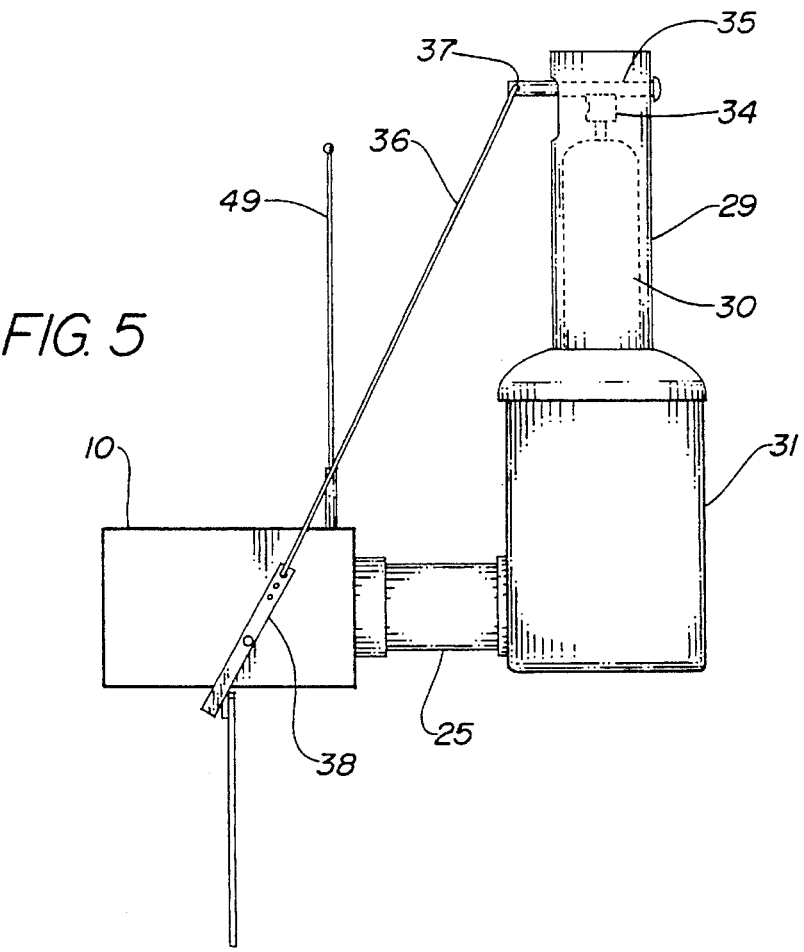
FIG. 5 is a partial side elevation of the invention showing the scent spray assembly.
Figure 6:
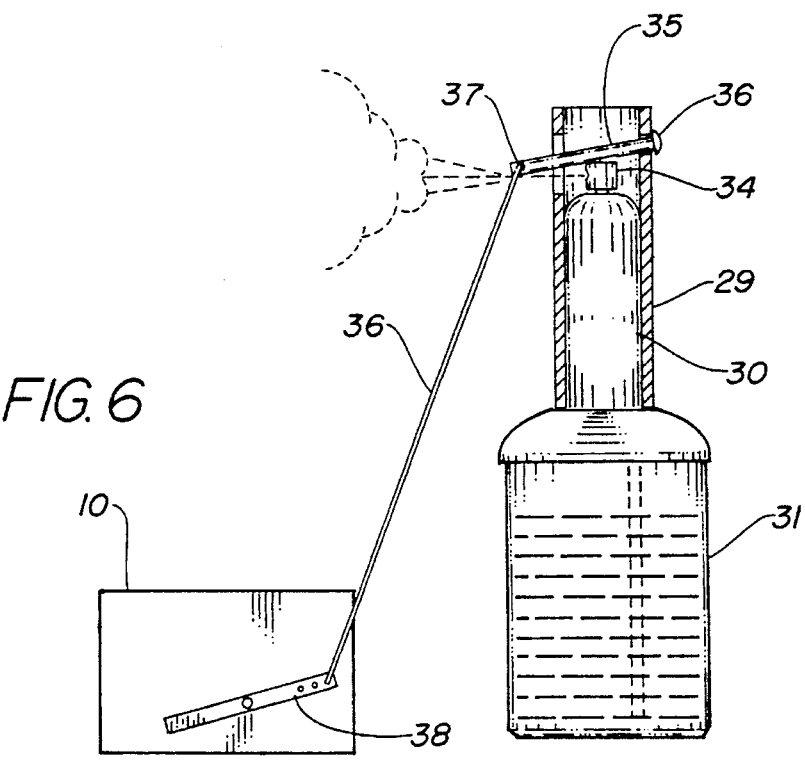
FIG. 6 is a partial sectional view of FIG. 6 illustrating the operation of the scent spray.

The primary components of the preferred embodiment are shown in FIGS. 3 and 4 with the tripod 11 and other support means removed for clarity. A hanging antler 16 is hung from the component box 10 so that a limited degree of freedom of motion is provided to the hanging antler 16; in other words, the hanging antler 16 is able to rotate and swing slightly under the impetus of the swinging antler 17, the wind or other force. The hanging antler 16 is not however moved directly by the invention, but only indirectly. In one version of the invention, the hanging antler 16 is hung from a hook 20 which freely swings from a bracket 21 which is attached to the component box 10. Alternatively, the hanging antler 16 could be suspended from a chain or cord. Fishing line has been found to be effective. The swinging antler 17 is attached by a hook 22 to a rattle arm 23. As will be described more fully below, the rattle arm may be rotated through an arc so as to swing the swinging antler 17 into the hanging antler 16 so as to produce a clashing sound reminiscent of the sparring of antlered animals. In an alternative embodiment both antlers 16, 17 may be swingable to increase the force of impact. The antlers 16,17 may be real antlers or may be synthetic. In addition a realistic simulation may be obtained from bags of wooden rods, all of which may be used in the present invention. Any use of the expression "antlers" or similar expression within the scope of this specification or the appended claims is to be understood as referring to any of the above described forms of antlers or simulated antlers.

Continuing to refer to FIGS. 3 and 4, the scent spray assembly 18 may be described. The scent spray assembly 18 comprises a support arm assembly 24 which comprises an elbow extension 25 attached to the component box 10 and which in turn is connected to an upright member 26. The upright member 26 connects to an elbow 27, thence to a horizontal member 28, and thence to a spray canister holder 29. The spray canister holder 29 is sized to receive a spray canister 30 which may be held in the spray canister holder 29 by friction fit, by a set screw through the spray canister holder 29 or by any other means apparent to one skilled in the art. The Preval Power Unit Sprayer made by Precision Valve Corporation of Yonkers, N.Y. has been found to provided acceptable action as the spray canister 30 in the present invention. The spray canister 30 provides a pressurized aerosol propellant which, when activated, produces an aerosol spray from the liquid scent contained in a scent reservoir 31, as will be described more fully with reference to FIGS. 3, 4, 5 and 6.

The spray canister holder 29 is pierced with a hole 32 and vertical slot 33. The top of the spray canister 30 is provided with a nozzle 34 which when depressed releases the aerosol propellant from the canister 30 along with entrained scent from the reservoir 31. The hole 32 and slot 33 are disposed in the spray canister holder 29 so that a nozzle lever 35 passing through the hole 32 and the slot 33 just clears the nozzle 34. The nozzle lever is prevented from passing completely through the hole 32 by a broadened head 36; however, the slot 33 allows the nozzle lever 35 to be depressed downward through the slot 33 so as to depress the nozzle 34. When nozzle 34 is depressed the spray of aerosol propellant and scent exits through slot 33.

Nozzle lever 35 is depressed through the action of linkage 36 which is rotatably attached to nozzle lever 35 through a hole 37 in the end of nozzle lever 35 opposite to head 36. Linkage 36 depresses nozzle lever 35 when spray servo arm 38 is rotated as shown from FIG. 5 (unrotated) to FIG. 6 (rotated).

Figure 9:
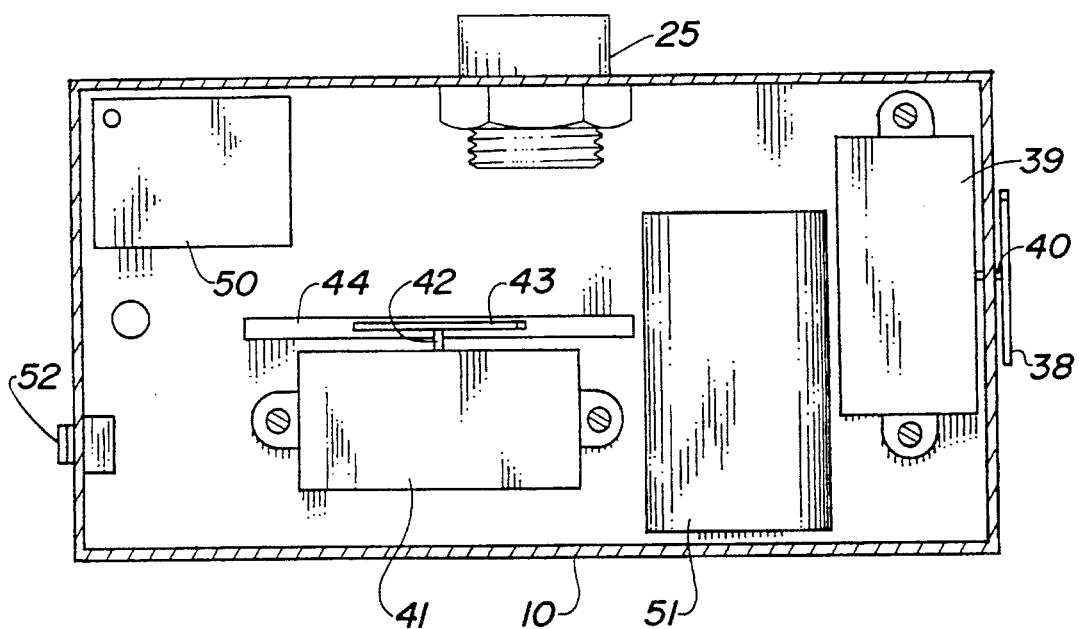
FIG. 9 is top sectional view of the interior layout of the component box.
Figure 10:
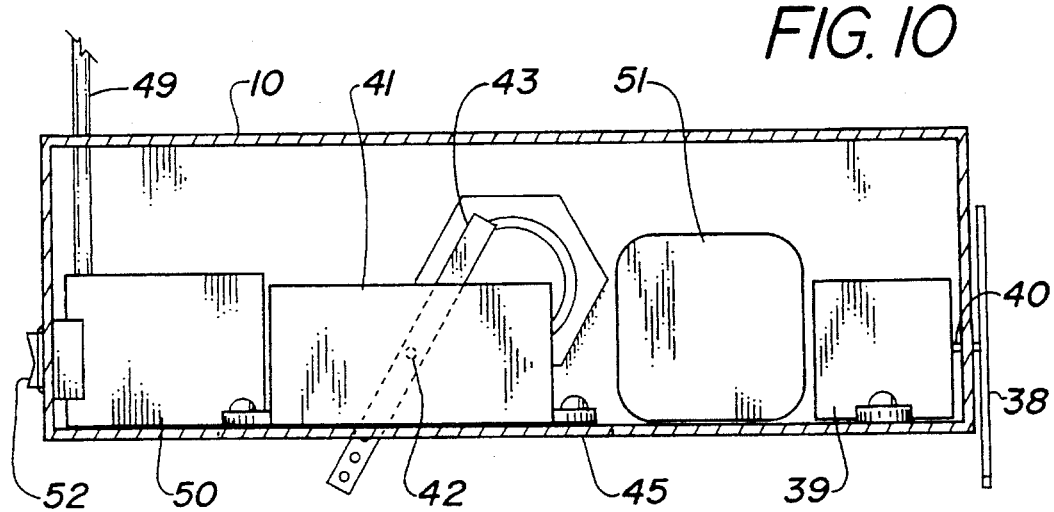
FIG. 10 is a front sectional elevation of the interior layout of the component box.

Spray servo arm 38 is attached to spray servo 39 which is disposed within component box 10 as shown in FIGS. 9 and 10. Spray servo 39 is affixed within component box 10 such that spray servo shaft 40 extends through the side of component box 10 and is attached to spray servo arm 38. Activation of spray servo 39 thus produces rotation of spray servo shaft 40 and thus rotation of spray servo arm 38. The rotation of spray servo arm 38 then produces the action of linkage 36 as described above.

Figure 8:
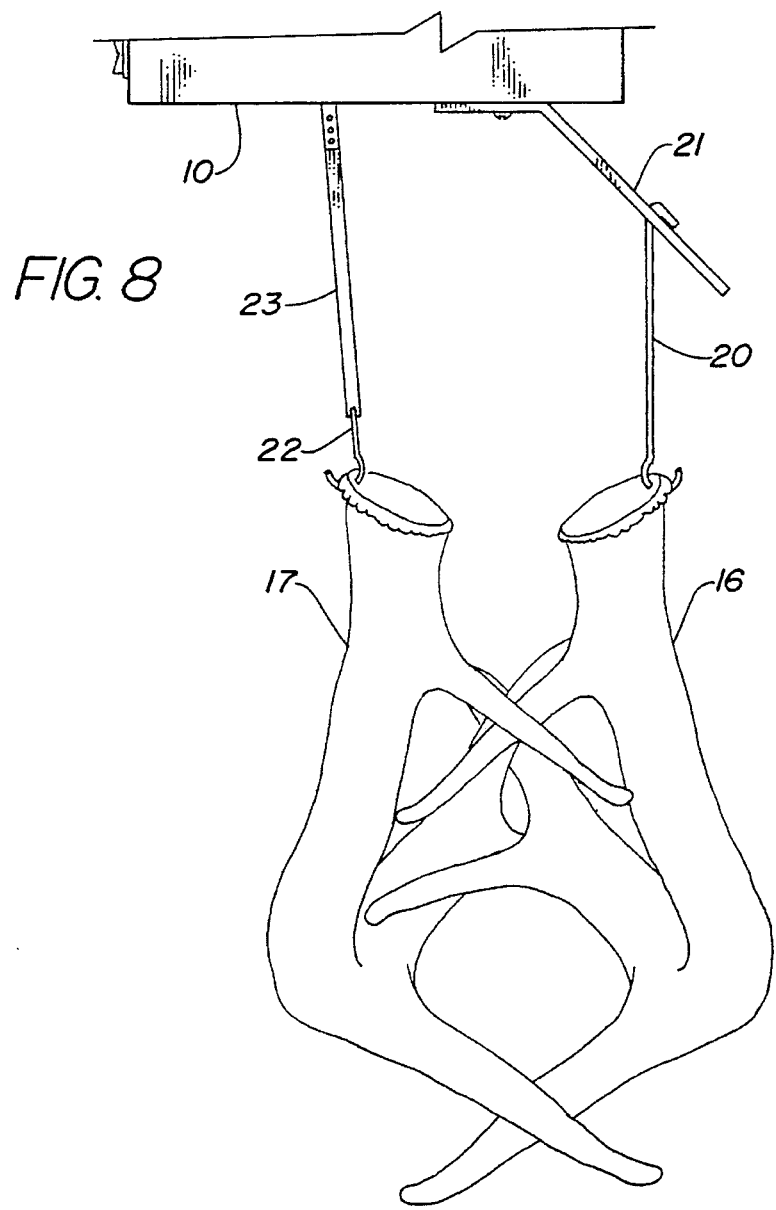
FIG. 8 is a partial front elevation of the invention showing the clashing action of the antlers.

In an similar manner, the antler servo 41 is affixed to the component box 10 as shown in FIGS. 9 and 10. The activation of antler servo 41 causes the rotation of antler servo shaft 42. Antler servo shaft 42 in turn is attached to antler servo arm 43 which rotates as antler servo shaft 42 rotates. A slot 44 in provided in the bottom 45 of the component box 10 so that the antler servo arm is able to rotate freely. The antler servo arm 43 is rigidly affixed to the rattle arm 23 so that the rotation of the antler servo arm 43 is amplified by the motion of the rattle arm 23 which imparts an arc-like swinging motion to the swinging antler 17 so as to clash into hanging antler 16 as shown in FIG. 8.

Figure 7:
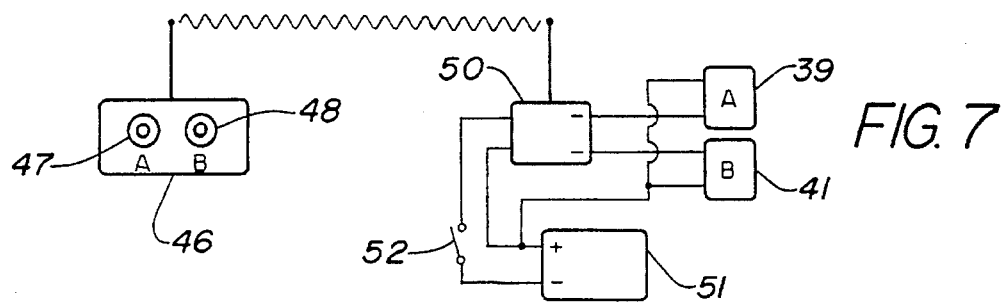
FIG. 7 is a schematic diagram of the electrical connections among the radio transmitter and receiver and the servo mechanisms.

In the preferred embodiment, the servos 39,41 are activated by transmitted radio signals which will be described with reference to FIGS. 7, 8 and 9. A transmitter 46 located at a distance from the device is provided with two servo control channels, one designated A on FIG. 7 is controlled by spray joystick 47 and the other designated B is controlled by antler joystick 48. Motion by the user of joysticks 47, 48 cause the transmission of radio signals to the antenna 49 of radio receiver 50. Radio receiver 50 decodes the radio signals so as to activate servos 39, 40 respectively. Radio receiver 50 and servos 39, 40 are powered by battery pack 51 which is controlled by power switch 52. The battery pack 51 may be rechargable. In addition, solar panels may be deployed to extend the charge of the battery pack 51. A Futaba ATTACK-R-FP-T2NBR transmitter for surface transmissions is one of many transmitters on the market that is useable in the present invention. A Futaba FP-R112JE receiver and Futaba S-148 servos have been used successfully as well.

While the preferred embodiment is illustrated by a two channel radio controlled servo system, additional servo channels could be added to actuate additional sensory effects. For example, an animal call of the mechanical type could be activated by servos moving one part against another as would be possible in purely mechanical type calls or by the activation of pressurized air in the pneumatic type calls.

An alternative embodiment of the present invention provides other means than radio controlled servo mechanisms for activating the scent spray and antler rattling operations in the present invention by the using a repeat cycle time delay mechanism. A Syrelic DRU repeat cycle with relay output is one of the time delay relays useable for this operation. The time delay relay has the setting capabilities to repeat cycle and relay output to the antler and spray servos at time intervals set by the user. A motor may be used in place of a servo mechanism. The motor turns a wheel with a linkage arm connected in an offset fashion to the wheel and thence to one end of the rattle arm 23. The rattle arm is pivoted so that the rotation of the wheel make the rattle arm swing back and forth.

The entire invention can be carried in a nylon bag. The nylon bag may be designed to open out into a skirt which may be used to camouflage the action of the antlers 16, 17. Furthermore, it may be desirable to camouflage the transmitter 46 and to paint the component box 10 the scent spray assembly 24 and the tripod 11 in camouflage colors.

The present invention has been described with reference to certain preferred and alternative embodiments which are exemplary only and not by way of limitation to the full scope of the invention as set forth in the appended claims.

What is claimed is:

1. An apparatus for attracting animals, comprising:
   (1) an enclosure;
   (2) a rattling device mounted to said enclosure for producing sounds of antlers rattling, said device comprising:
      (a) two arms protruding from said enclosure, at least one of said arms having one end movable toward and away from the other of said arms;
      (b) two rattling objects adapted to imitate said sounds of antlers rattling when striking contacts are made between said rattling objects, said rattling objects each respectively connected to a respective one of said arms; and,
      (c) a first electro-mechanical drive means mounted in said enclosure and operatively connected to said at least one of said arms for causing movement thereof, and in turn causing striking contacts between said rattling objects to generate said sounds of antlers rattling;
   (3) a scent producing device mounted to said enclosure, said scent producing device comprising:
      (a) a support extension connecting said scent producing device to said enclosure;
      (b) a refillable container mounted on said support extension and containing a scented material;
      (c) a spray nozzle depressibly attached to said container for dispensing said scented material when depressed; and,
      (d) a second electro-mechanical drive means, said second electro-mechanical drive means including linkage means and a lever engaged with said nozzle for depressing said nozzle to dispense said scented material;
   (4) electrical power supply means mounted in said enclosure for activating said first and second electro-mechanical drive means; and,
   (5) control means mounted in said enclosure and connected to said electrical power supply means for receiving a control signal and controlling the functions of said first and second electro-mechanical drive means corresponding to the signals received.

2. The apparatus of claim 1 wherein said electrical power supply is a rechargeable battery pack.

3. The apparatus of claim 2 further comprising a solar panel for recharging said battery pack.

4. The apparatus of claim 1 wherein said control means includes a radio receiver for receiving radio controlled signals.

5. The apparatus of claim 4 further comprising means for transmitting control signals to said radio receiver from a remote site away from said enclosure.

6. The apparatus of claim 1 wherein said control means includes a repeat cycle time delay device adjustable by a user for predetermining the time functions of said first and second electro-mechanical drive means.

7. The apparatus of claim 1 wherein said rattling objects are a pair of antlers.

8. The apparatus of claim 1 further comprising a pressurized air actuated animal call and means for supplying pressurized air to said animal call for producing an animal sound.

* * * * *